Figure 1:
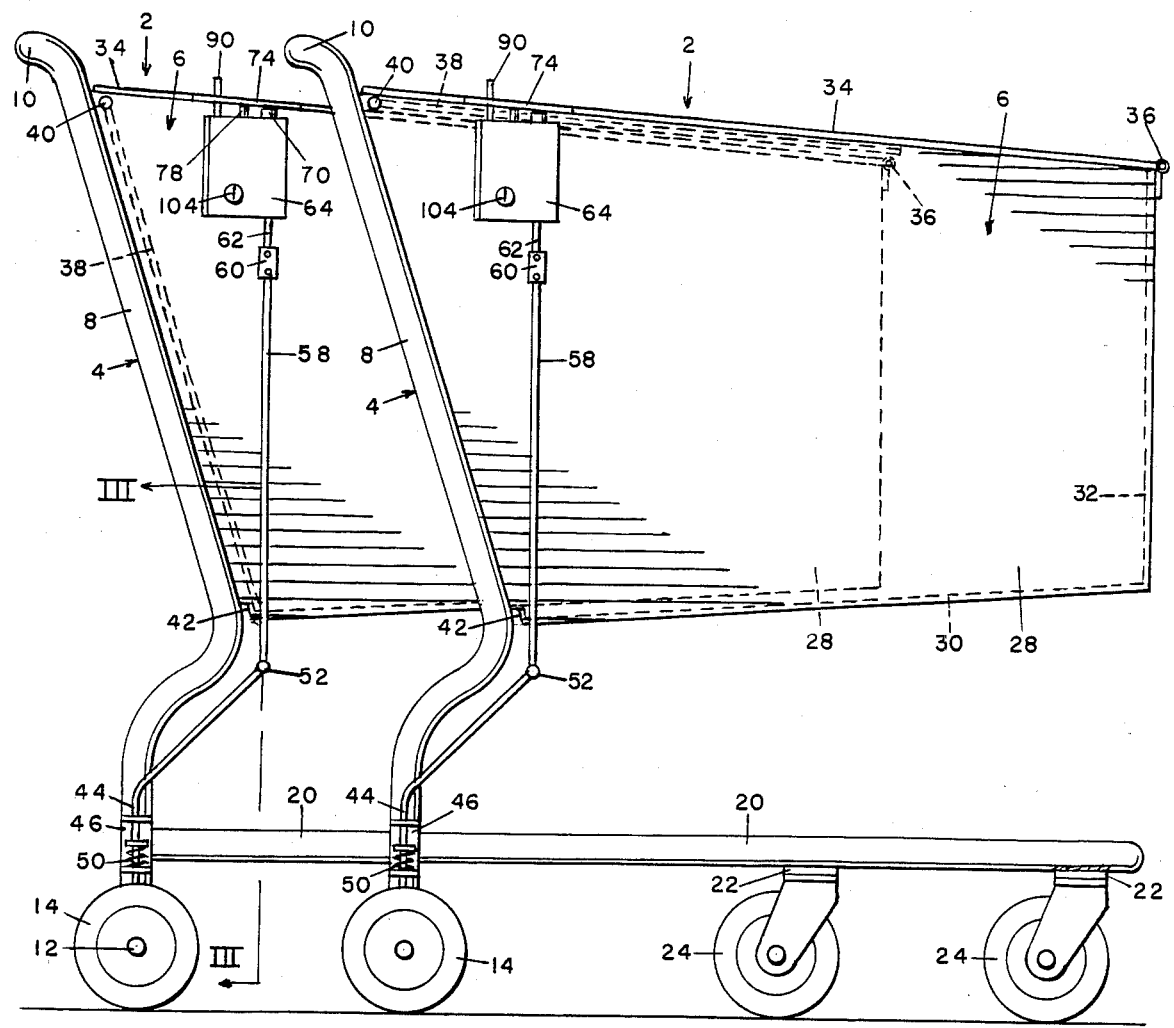

United States Patent [19]

Balha

[11] Patent Number: 4,545,591
[45] Date of Patent: Oct. 8, 1985

[54] SHOPPING CART

[76] Inventor: Frances R. Balha, 932 Chevy Chase Dr., Sarasota, Fla. 33580

[21] Appl. No.: 585,381

[22] Filed: Mar. 2, 1984

[51] Int. Cl.³ ............................................. B62B 5/04
[52] U.S. Cl. ................................ 280/33.99 C; 70/57
[58] Field of Search ................. 280/33.99 C, 33.99 R, 280/33.99 F, 47.34, 79.1; 70/57; 206/513, 515, 518; 292/156, 162, 177; 186/27, 29

[56] References Cited

U.S. PATENT DOCUMENTS 3,994,505 11/1976 Balha ............................ 280/33.99 C
4,116,464 9/1978 Haley ............................ 280/33.99 C

FOREIGN PATENT DOCUMENTS 2325685 12/1974 Fed. Rep. of Germany.. 280/33.99 A

Primary Examiner—Joseph F. Peters, Jr.
Assistant Examiner—Mark C. Dukes
Attorney, Agent, or Firm—John A. Hamilton

[57] ABSTRACT

A shopping cart including a wheeled basket having a hinged cover and a rear wall pivotable upwardly and forwardly by the forward end of the basket of a like cart to permit nesting of said carts. Mechanism is provided whereby the wheels are locked when the cover is open and unlocked when the cover is closed, although the wheel lock may be operated manually if the cover is held open by overloading of the basket. Mechanism is also provided for locking the rear basket wall whenever the wheels are locked. A key lock mechanism is provided for locking the cover, wheels and rear basket wall in the event the user desires to leave the cart unattended.

8 Claims, 11 Drawing Figures

4,545,591

SHOPPING CART

This invention relates to new and useful improvements in shopping carts, and relates more specifically to improvements over the shopping cart shown in my own prior U.S. Pat. No. 3,994,505, issued Nov. 30, 1976.

My prior patent disclosed a shopping cart of a type commonly used in shopping malls and the like for the convenience of shoppers in carrying multiple purchases, and consisting basically of a wheeled, manually propelled cart including an open-topped basket. The principal thrust of that invention was the provision of features rendering it both more convenient to use, and also safer from theft, theft both of articles from the basket, and also of the entire cart. Such thefts are unfortunately all too common, and represent a very real problem. Features directed to this end were the provision of a hinged cover for the basket, means for locking at least some of the cart wheels against rotation, and mechanism for locking the wheels whenever the cover is opened, so that the cart cannot roll, for example on inclined ramps and the like, while the user is placing a package in the basket, and unlocking the wheels when the cover is closed, so that the cart can be wheeled about freely with the cover, then secured closed by a manually operable latch, denying access to the basket by a thief. A key-operated mechanism was provided for locking both the cover and the wheels positively in the event the user might desire to leave the cart unattended for short periods of time.

However, the cart disclosed by my prior patent, while fully effective in its intended functions, was subject to the disadvantages that it could not be nested with other like carts, that is, it could not be moved to project partially into another like cart in order that a large number of carts would, when not in actual use, occupy a relatively small floor space. Each cart required its own full horizontal area of floor space. This limitation has proved to be a serious obstruction to wide adoption of the cart, since floor space for carts not in use is quite limited in most shopping facilities.

Accordingly, the primary object of the present invention is the provision of a shopping cart which, while still performing all of the functions of the cart shown in my prior patent, is also freely nestable with other like carts, in the same manner as many carts already in common use.

Perhaps the most widely used nestable shopping cart provides the nesting function by providing a basket portion which is forwardly tapered in order to receive the forward portion of the basket of a cart disposed therebehind telescopingly thereinto. This concept, also utilized in my present cart, of course necessitates that the basket be provided with a rear wall pivoted at its upper edge, so that it may be deflected upwardly and forwardly by the nose of the following basket during the nesting process. However, such a pivoted rear basket wall may also be pivoted manually, and thus represents an additional access by a thief to the contents of the basket. Accordingly, another object of the present invention is the provision, in a cart utilizing a basket cover and wheel locks as before, as well as a pivoted rear basket wall, of means whereby the rear basket wall is locked against opening whenever the wheels are locked against rotation, and is also retained positively locked by the described key-operated lock.

Other objects are ease and convenience of use, simplicity and economy of construction, and efficiency and dependability of operation.

Figure 2:
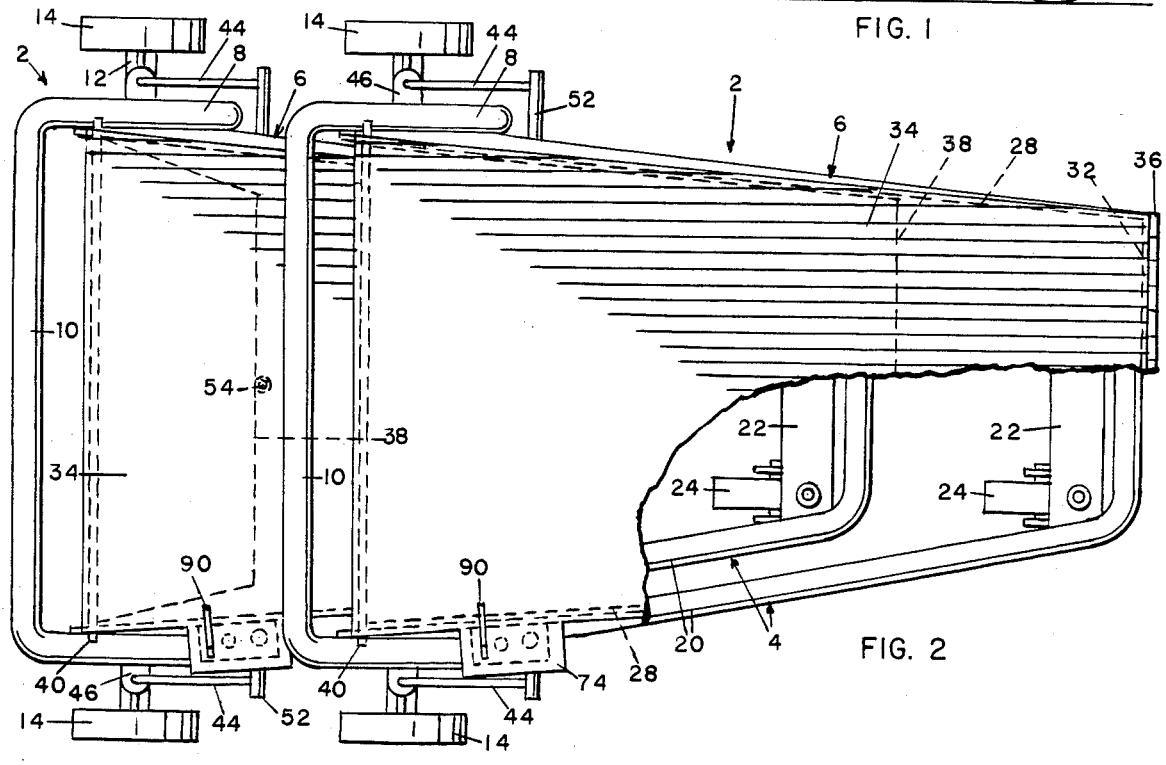
Figure 3:
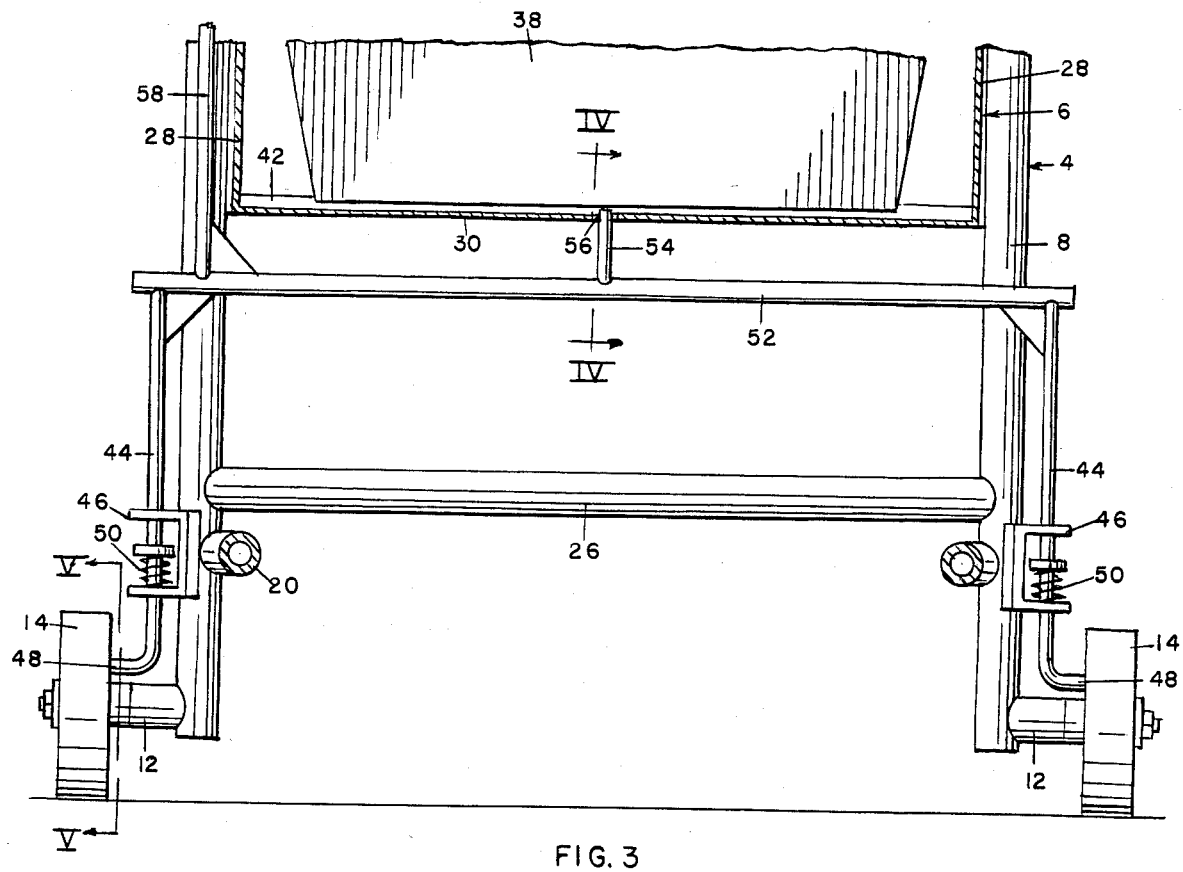
Figure 5:
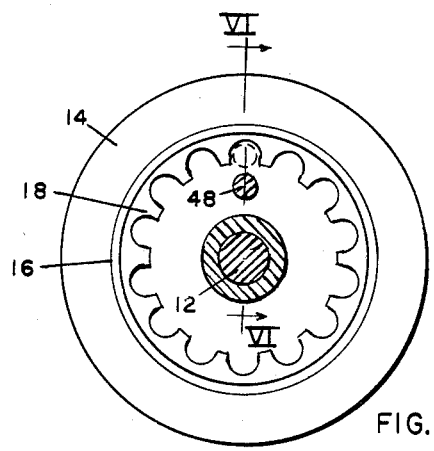
Figure 4:
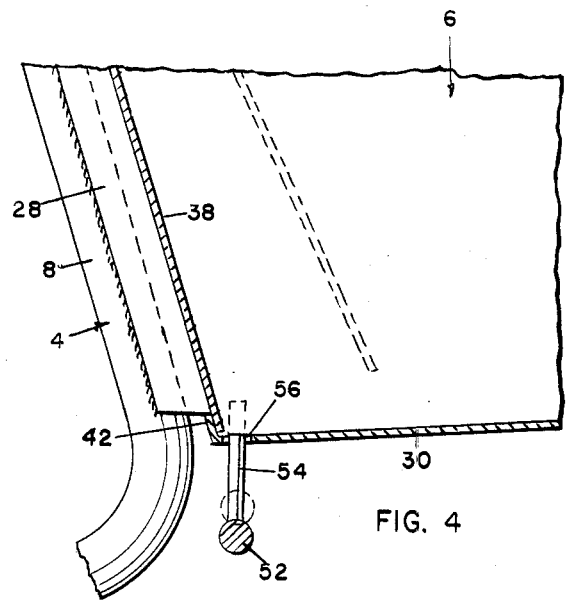
Figure 6:
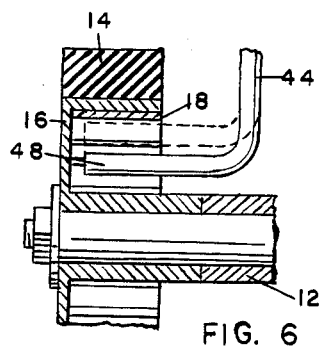
Figure 7:
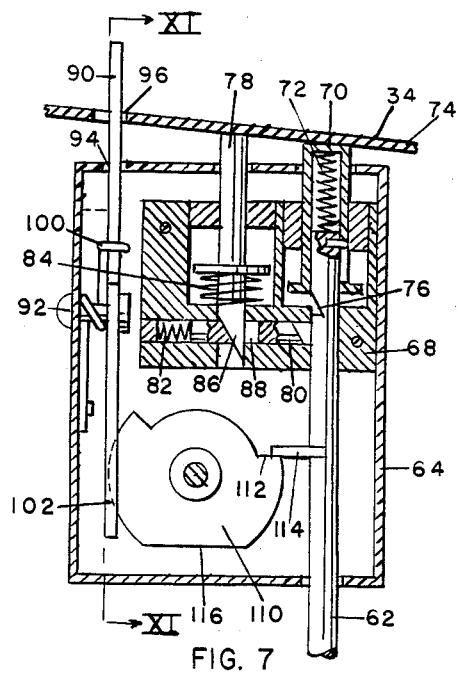
Figure 8:
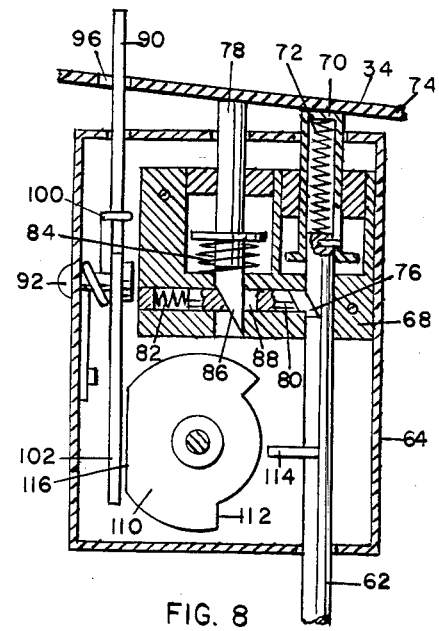
Figure 9:
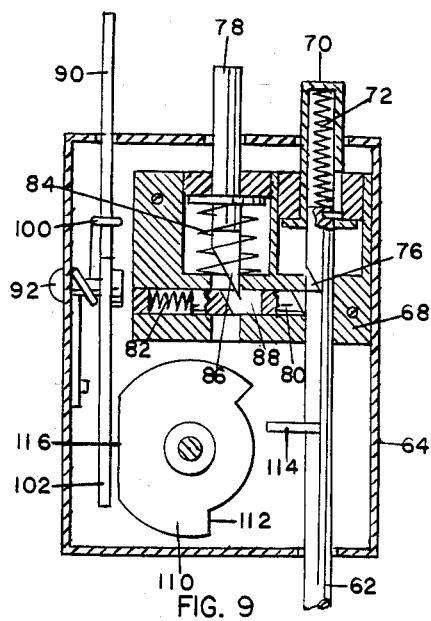
Figure 10:
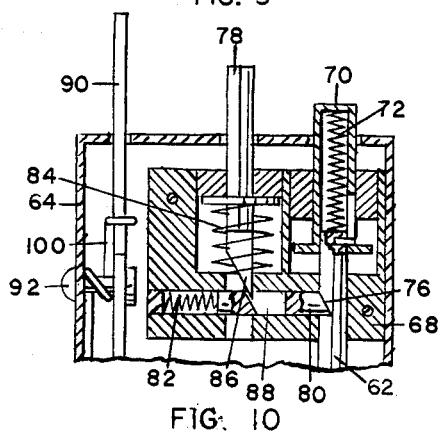
Figure 11:
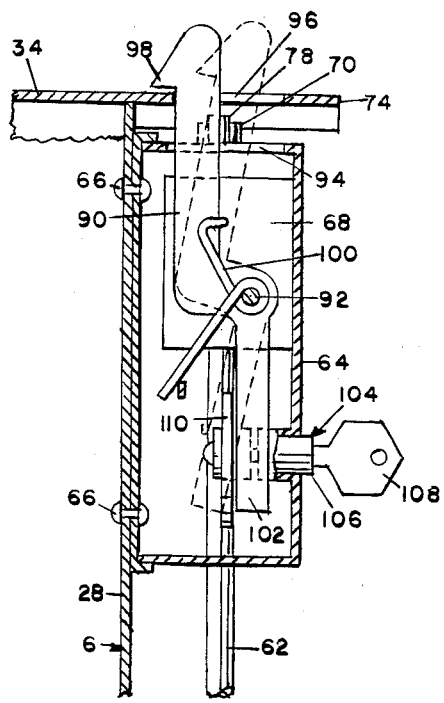

With these objects in view, as well as other objects which will appear in the course of the specification, reference will be had to the accompanying drawing, where:

FIG. 1 is a side elevational view of a pair of shopping carts embodying the present invention, shown in nested relation, FIG. 2 is a top plan view of the pair of carts shown in FIG. 1, with parts broken away, FIG. 3 is an enlarged, fragmentary sectional view taken on line III—III of FIG. 1, FIG. 4 is an enlarged, fragmentary sectional view taken on line IV—IV of FIG. 3, FIG. 5 is an enlarged sectional view taken on line V—V of FIG. 3, showing a wheel of the cart unlocked in solid lines, and locked in dotted lines, FIG. 6 is a fragmentary sectional view taken on line VI—IV of FIG. 5, FIG. 7 is an enlarged vertical sectional view through the control box of the locking system looking toward the basket, showing the positions of the parts when the key-operated lock is engaged, positively locking the basket cover and rear wall, as well as the cart wheels, FIG. 8 is a view similar to FIG. 7, but showing the parts when the key-operated lock is disengaged to unlock the cart wheels and rear basket wall, but leaving the basket cover latched closed, FIG. 9 is a view similar to FIG. 8, but showing the positions of the parts when the basket cover is opened, the cart wheels and the rear basket walls still being locked, FIG. 10 is a fragmentary view similar to FIG. 9, but showing the parts when the cart wheels and rear basket wall have been unlocked manually, independently of the basket cover, and FIG. 11 is a sectional view taken on line XI—XI of FIG. 7, showing the basket cover latched in solid lines, and unlatched in dotted lines.

Like reference numerals apply to similar parts throughout the several views, and in FIGS. 1 and 2, the numeral 2 applies generally to each of a pair of shopping carts embodying the present invention. Each of said carts includes basically a frame 4 and a basket 6. Frame 4 is formed of tubular metal stock, and includes a rear frame member 8 of substantially inverted U-form, the top connecting portion thereof extending horizontally and transversely of the cart, and forming a handle 10 by means of which the cart may be manually propelled. At the lower end of each of the generally vertical side members of frame member 8, there is provided a short, outwardly extending horizontal stub axle 12, at the outer end of which a floor-engaging rear wheel 14 is rotatably mounted. The hollow hub 16 of each rear wheel 14 (see FIGS. 5 and 6) has a toothed insert 18 fixed therein concentrically with axle 12, the teeth thereof opening toward the axle. This toothed insert forms an element in the means for locking the rear cart wheels against rotation, as will presently appear. Frame 4 also includes a front member 20, also of generally U-form, having its side members welded or otherwise fixed to the uprights of rear frame member 8, above the level of rear wheels 14, and extending horizontally forwardly, being taperingly narrowed toward its forward end. Adjacent the forward end of frame member 20, a horizontal cross bar 22 is extended laterally across and affixed thereto. On said cross bar there are mounted a pair of laterally spaced apart floor-engaging front wheels 24. Said front wheels are castered about a vertical axis, whereby the cart may be manually steered as it is rolled over the floor. The forward taper of frame element 20 of each cart permits it to be nested forwardly into element 20 of another like cart, as indicated in FIGS. 1 and 2. For rigidity, the uprights of rear frame member 8 may be rigidly interconnected by a horizontal transverse cross bar 26 (see FIG. 3) disposed at an elevation above that of front frame member 20.

Basket 6, as shown, is formed of sheet metal, including a pair of side walls 28 welded or otherwise affixed at their rearward edges to the uprights of rear frame member 8, and extending forwardly therefrom, a bottom wall 30 interconnecting the lower edges of side walls 28, and a vertical front wall 32 interconnecting the forward edges of side walls 28 and bottom wall 30. The basket also has a top cover 34 adapted to close substantially the entire top area thereof, and hinged at its forwrd edge to the top edge of front basket wall 32, as at 36. The basket also has a rear wall 38, pivoted at its upper edge between side walls 28 of the basket, on a horizontal transverse axis, as at 40. As seen, it normally slopes downwardly and forwardly, its rearward movement being limited by its engagement with an upturned lip 42 at the rearward edge of basket floor 30. It will be seen that the basket is taperingly narrowed in a forward direction, in both horizontal and vertical planes, in order that the forward portion of one basket may nest forwardly into the rearward portion of the basket of another like cart, also as shown in FIGS. 1 and 2. In moving to this nested position, the nose end of the basket of the rearward cart engages and pivots rear wall 38 of the forward cart forwardly and upwardly, as shown. While the basket is shown as formed of sheet metal, it could be formed entirely, including its cover and rear wall, of the more common wire mesh panels, but the sheet metal has the advantage of concealing its contents from potential thieves.

Each of the rear cart wheels 14 may be locked against rotation by means including a vertical rod 44 mounted for vertical sliding movement in a bracket 46 affixed to the adjacent upright of rear frame member 8. At its lower end, said rod is bent outwardly to form a lock pin 48 extending into the toothed insert 18 of wheel 14, so that said wheel is locked whenever the lock pin is elevated to engage it between the teeth of the toothed insert, as shown in dotted lines in FIGS. 5 and 6, and unlocked when the lock pin is lowered, as shown in solid lines. The lock pins, and rods 44, are continuously biased upwardly, whereby to lock the wheels, by springs 50 mounted in brackets 46. Rods 44 extend upwardly from brackets 46, and are rigidly affixed at their upper ends to the respectively opposite ends of a bar 52 which extends horizontally and transversely beneath the rearward portion of basket 6. Affixed to the midportion of bar 52 is a short, upstanding lock pin 54 which projects upwardly through a hole 56 formed in basket floor 30. When bar 52 is raised by springs 50 to lock wheels 14, pin 54 projects upwardly into the basket closely adjacent but forwardly of the lower edge of rear basket wall 38, as shown in dotted lines in FIG. 4, thereby locking the rear wall closed, against upward and forward pivoting thereof. When bar 52 is lowered, as shown in solid lines, the rear wall is free to pivot. Thus rear wall 38 is locked whenever wheels 14 are locked, and unlocked whenever the wheels are unlocked..

A vertical rod 58 is rigidly affixed to bar 52 adjacent one end of the latter, and extends upwardly along one side of the basket, exteriorly thereof, being connected by a coupling 60 to a vertical rod 62 which extends upwardly into a sheet metal box 64 containing elements of the locking system. "Lock box" 64 is affixed to the exterior surface of one of side walls 28 of the basket, just below the top edge thereof, and on a portion of said side wall which does not nest within a cart disposed forwardly thereof, as by rivets 66 (see FIG. 11).

Rod 62, which is biased upwardly by springs 50 at wheels 14, extends upwardly into box 64 and is engaged slidably in a vertical bore provided therefor in a block 68 affixed in the upper portion of the box. Within said block, rod 62 is capped by a hollow tubular pushbutton 70 which is vertically slidable on the rod to a limited degree, and which is biased upwardly relative to the rod by a compression spring 72 disposed therein. Said spring is of sufficient strength to overcome the bias of springs 50 when the pushbutton is depressed. The pushbutton extends through the top of box 64 to a level somewhat higher than the top of the basket, so as to be depressed by a lateral extension 74 of basket cover 34 when said cover is closed. A notch 76 providing an upwardly facing shoulder is formed in the side of rod 62 within block 68.

A rod-like pushbutton 78 parallel to rod 62 is carried slidably in a bore of block 68 at the side of rod 62 in which notch 76 is formed, and a latch pin 80 is carried slidably in a horizontal bore of the block which intersects the bores of rod 62 and pushbutton 78. The end of latch pin 80 toward rod 62 forms a pawl engageable in notch 76 to prevent rod 62 from rising under certain circumstances. The latch pin is biased to this notch-engaging position by a spring 82. Release pushbutton 78 is biased upwardly by a spring 84, but is formed at its lower end to present a tapered finger 86 operable, when the release button is depressed against its spring, to enter a cooperative aperture 88 formed vertically through latch pin 80 to cam said latch pin away from rod 62, against spring 82, thereby releasing said rod for upward movement. Pushbutton 78 also extends upwardly from box 64, and is depressed by lateral extension 74 of cover 34 whenever said cover is closed.

Disposed at one side of block 68 in box 64 is a cover latch bar 90, pivoted on a horizontal transverse rivet 92 secured in a side wall of the box. Said latch bar extends upwardly through a slot 94 in the top wall of the box, and through a slot 96 formed in lateral extension 74 of basket cover 34, and is provided at its upper end with a downwardly facing, laterally projecting finger 98 (see FIG. 11) which, when said latch bar is pivoted to the left as shown in FIG. 11, overlies the top surface of the cover, whereby to secure said cover in a closed position. Finger 98 may be pulled manually to the right, as shown in dotted lines, whereby the cover is freed and may be opened. The latch bar 90 is biased to its engaged position by a clock spring 100 mounted on rivet 92. The latch bar is also provided with an integral arm 102 extending downwardly from rivet 92.

A key lock mechanism indicated generally by the numeral 104 is also provided, and includes a lock cylinder 106 mounted in the outer wall of lock box 64 (see FIG. 11) and adapted to receive a key 108. When the proper key is inserted and cylinder 106 turned, it also turns a disc 110 mounted at the inner end of the cylinder. By turning the key, disc 110 may be turned 90 degrees counter-clockwise to the position shown in FIG. 7, or 90 degrees clockwise to the position shown in FIGS. 8 and 9, and firmly locked in either position by withdrawal of the key. Disc 110 is provided at one point of its periphery with a shoulder 112 facing in a counter-clockwise direction, which cooperates with a finger 114 fixed to rod 62 to elevate said rod against the pressure of spring 72 as the disc is turned in a counter-clockwise direction. Disc 110 obstructs movement of arm 102 of latch bar 92 to release cover 34 when said disc is at the counter-clockwise limit of its rotation, as in FIG. 7, but is provided with a "flat" edge 116 which reduces its radius at that point, so that latch bar arm 102 is freed for movement to unlatch cover 34 when the disc is turned to the clockwise limit of its rotation, as in FIGS. 8 and 9.

In operation, it will be seen that if cover 34 if fully closed to depress pushbuttons 70 and 78, and is releasably secured closed by latch bar 90, and if the proper key 108 is inserted and turned to rotate disc 110 in a counter-clockwise direction to its locked position, the parts contained in lock box 64 have the positions shown in FIG. 7. Rotation of the disc moves it into blocking relation to arm 102 of the latch bar, so that the cover is locked closed, and also causes shoulder 112 of the disc to engage and lift finger 114 of rod 62 to raise said rod against the pressure of spring 72. This elevation of rod 62 locks rear wheels 14 of the cart against rotation, and also causes lock pin 54 to lock rear basket wall 38 closed, assuming that it was already closed against lip 42 of the basket floor. The depression of pushbutton 78 retracts latch pin 80 against its spring 82. FIG. 7 thus represents the fully locked condition of the cart, and the user may then, after of course removing key 108, safely leave it unattended, at least for short periods of time, with no fear of theft, either of the cart itself or from its contents.

Upon returning to the cart, the user reinserts key 108 and turns lock disc 110 in a clockwise direction to its unlocked position, as shown in FIG. 8. This rotation of the disc frees its shoulder 112 from finger 114 of rod 62, so that said rod is lowered by spring 72, the pressure of this spring being greater than the opposite bias of springs 50 at wheels 14. Wheels 14 are thus unlocked, and the cart may be wheeled freely about. Rotation of disc 110 to its FIG. 8 position also frees latch bar 90 for pivotal movement on rivet 92, although said latch bar remains engaged with the cover to hold it closed. The latch bar may be released to allow the cover to be opened, by manually pivoting said latch bar against clock spring 100. However, the latch bar is closely adjacent the user's hands, rendering it unlikely that a "snatch and grab" thief could remain undetected while opening the cover to steal the contents of the basket. This is the condition which would normally prevail as the user pushes the cart about and remains in close attendance thereon, except when the user releases the latch bar and raises the cover to insert articles into or remove them from the basket.

When the user opens cover 34 as just described, the lock box parts assume the position shown in FIG. 9. Pushbutton 78 is elevated by spring 84, thus releasing latch pin 80 for movement toward rod 62. Pushbutton 70 is elevated by its spring 72, and rod 62 is elevated by springs 50, since spring 72 no longer resists elevation of said rod. Latch pin 80 does not engage notch 76 of rod 62 at this time, since said notch rises above the level of the latch pin before the latter can engage it. The elevation of rod 62 locks wheels 14 as previously described. This is a convenience to the user, since the cart cannot roll, for example on inclined ramps or floors, while he is placing articles into or removing them from the basket.

If the basket should be so overfilled with purchases that its contents extend above its top, cover 34 cannot be completely closed to unlock wheels 14 by depression of pushbutton 70, as is normally the case. However, the wheels 14 may still be unlocked, and remain unlocked, even when cover 34 is open, by pressing pushbutton 70 downwardly as illustrated in FIG. 10. This lowers rod 62 to unlock the wheels, spring 72 being sufficiently strong to overcome the opposite bias of springs 50, and the pawl end of latch pin 80 engages in notch 76 of the rod to secure it in its depressed position. The wheels may also be locked independently of cover 34, by depressing pushbutton 78 manually, which causes it to cam the pawl end of latch pin 80 out of engagement with notch 76 of rod 62, allowing said rod to be elevated by springs 50 to again lock wheels 14. Pushbuttons 70 and 78 may be respectively labelled "Unlock" and "Lock" for the convenience of the user.

In a nesting cart as described, it is of course essential that rear basket wall 38 be freely pivotable upwardly and forwardly as the nesting motion occurs. On the other hand, free movement of said rear wall at all times would permit access by a thief to the basket contents. It is therefore important that it be locked whenever the user may not be in close attendance on the cart. The pin 54 for locking said rear basket wall, as here provided, locks the basket wall whenever wheels 14 are locked. This includes any time during which the user is not present. The wheels must be unlocked during the nesting motion, when the rear basket wall must be free, and the present structure provides this operation. However, after nesting is completed, wheels 14 may again be locked by turning and removing key 108.

While I have shown and described a specific embodiment of my invention, it will be readily apparent that many minor changes of structure and operation could be made without departing from the spirit of the invention.

What I claim as new and desire to protect by Letters Patent is:

1. A shopping cart comprising:
   a. a frame nestable forwardly into the frame of another like cart,
   b. ground-engaging wheels carried rotatably by and supporting said frame,
   c. a basket open at its rearward end mounted on said frame and being forwardly tapered whereby to be nestable forwardly into the basket of another like cart,
   d. a rear basket wall operable when closed to close the rearward end of said basket, but being pivotably mounted on a horizontal transverse axis at its upper edge, whereby to be deflectable upwardly and forwardly by the forward end of the basket of a like cart to permit nesting of said baskets,
   e. a mechanical locking device operable when engaged to lock said rear basket wall closed, and to lock at least certain of said wheels against rotation, and
   f. manual operating means for selectively engaging and disengaging said locking device.

2. A shopping cart as recited in claim 1 with the addition of a key mechanism operable by means of a removable key to move said locking device to, and positively lock it in, its engaged position.

3. A shopping cart as recited in claim 1 wherein said basket is open-topped, and with the addition of a cover hinged to said basket and manually movable between open and closed positions respectively allowing and blocking access to the interior of said basket, said manually operable means being mechanically operable by said cover to engage said locking device when said cover is open, and to disengage said locking device when said cover is closed.

4. A shopping cart as recited in claim 3 wherein said manually operable means includes a pair of pushbuttons, the first being operable when manually depressed to disengage said locking device, and the second being operable when manually depressed to engage said locking device, both of said pushbuttons being depressed simultaneously by said cover whenever said cover is closed, and with the addition of a mechanical interlock between said pushbuttons whereby said second button is rendered inoperative whenever it is depressed simultaneously with said first button.

5. A shopping cart as recited in claim 4 wherein said pushbuttons are concealed by said cover when said cover is closed, but exposed when said cover is open, whereby said locking device may be engaged or disengaged by manual manipulation of said pushbuttons whenever said cover is prevented from closing by overfilling of said basket.

6. A shopping cart as recited in claim 3 with the addition of a manually releasable spring latch operable when engaged to secure said cover in its closed position.

7. A shopping cart as recited in claim 6 with the addition of a key mechanism operable by means of a removable key to secure said spring latch positively against release, whereby said cover is locked in its closed position.

8. A shopping cart as recited in claim 7 wherein said key mechanism is also operable, as it is actuated to secure said spring latch against release to move said locking device to, and positively lock it in, its engaged position.

* * * * *